April 3, 1956   A. D. SCHULTZ ET AL   2,740,548
FUEL TANK CAP
Filed Feb. 23, 1952   2 Sheets-Sheet 1
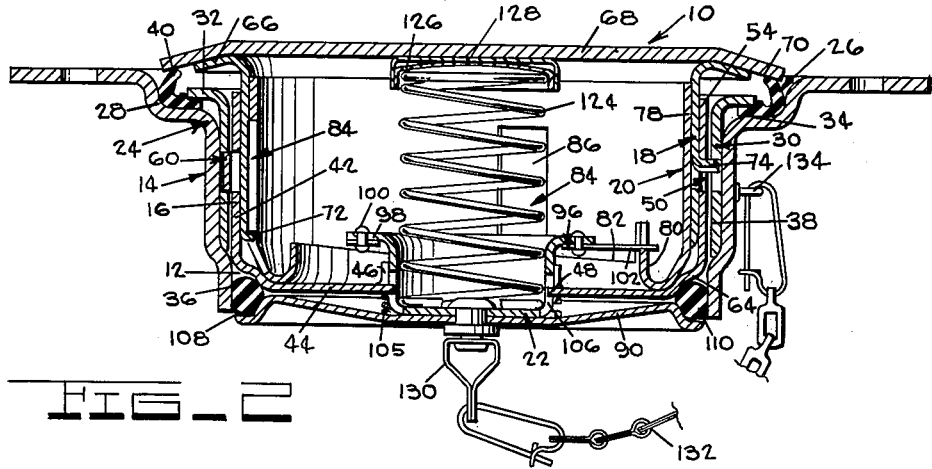
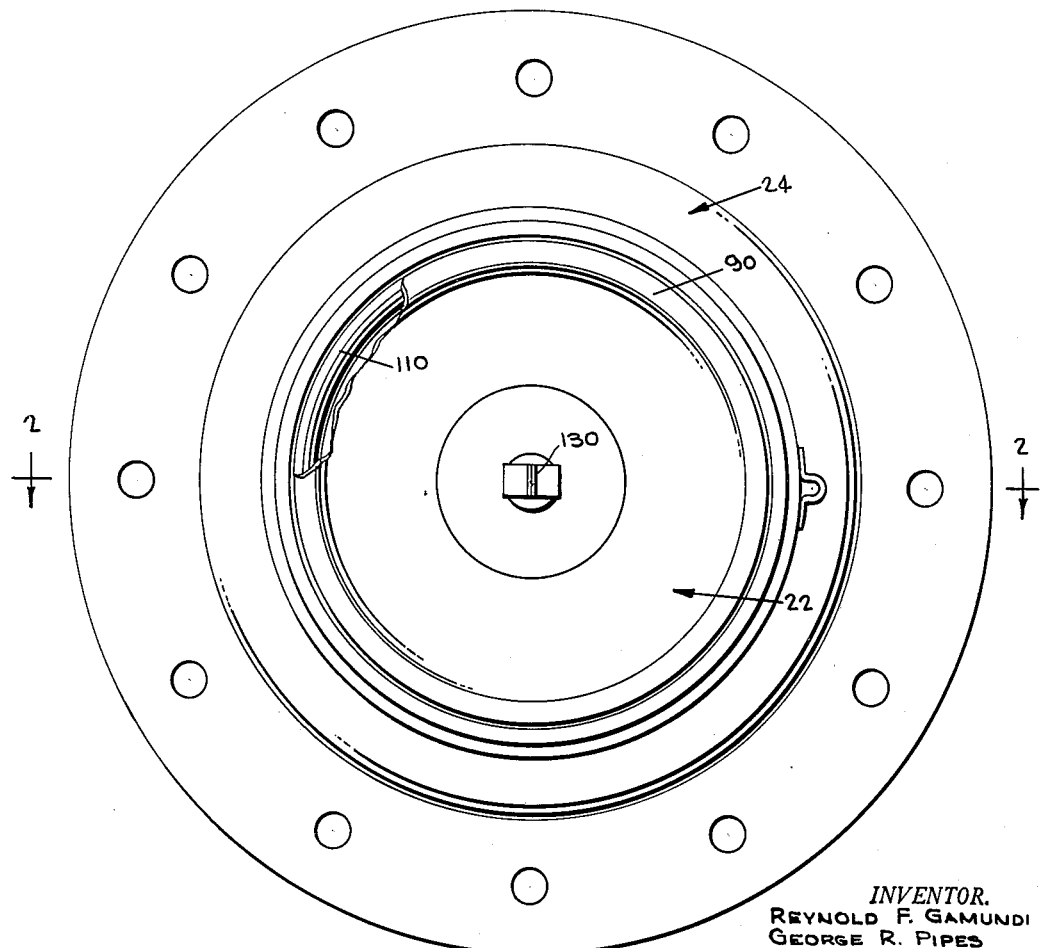
INVENTOR.
REYNOLD F. GAMUNDI
GEORGE R. PIPES
ROBERT E. LINN
ARTHUR D. SCHULTZ
BY McDonald & Teagno
ATTORNEYS

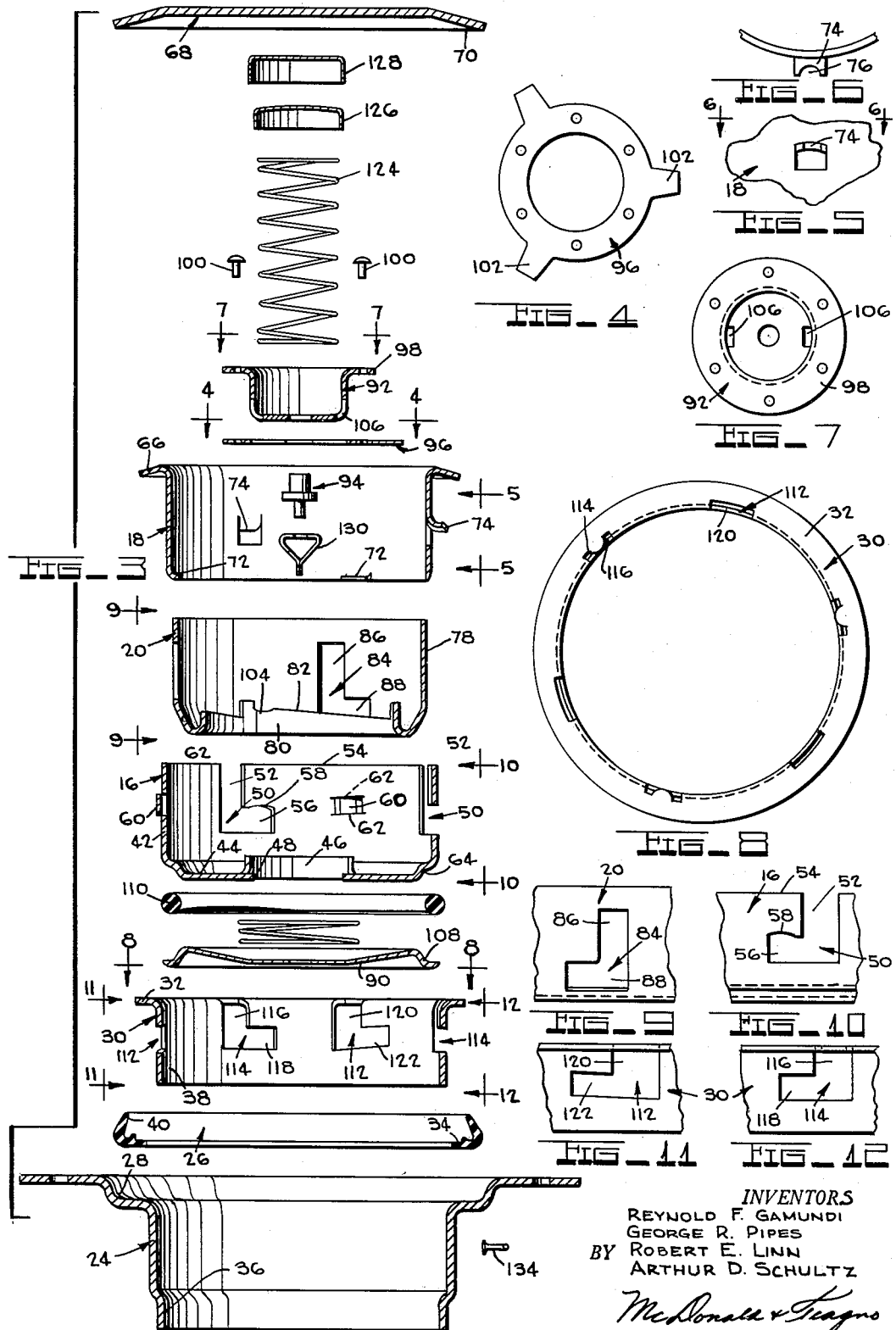

United States Patent Office 2,740,548
Patented Apr. 3, 1956

2,740,548

FUEL TANK CAP

Arthur D. Schultz and George R. Pipes, Mayfield Heights, Robert E. Linn, Shaker Heights, and Reynold F. Gamundi, Mayfield Heights, Ohio, assignors to Eaton Manufacturing Company, Cleveland, Ohio, a corporation of Ohio Application February 23, 1952, Serial No. 273,037

20 Claims. (Cl. 220—24.5)

This invention relates to closures and more particularly to caps for fuel containers and the like.

Broadly this invention comprehends the provision of caps for fuel containers, such as fuel tanks on aircraft and the like, capable of sealing various aircraft fuels under pressures. The cap comprises a plurality of cooperative elements having related axial and rotative movement to one another and adapted to be applied to an appropriate designed filler neck of a fuel container for the securement of the cap therein effective to perform its sealing requirements.

Among the principal objects of the invention is the provision of a fuel cap for application to filler necks of aircraft fuel tanks and the like, that:

1. Is effective to seal various aircraft fuels under pressures ranging up to 100 lbs. per square inch and resist much higher momentary pressures under the shock of gun fire;
2. Is readily removed and installed without the use of tools under all types of weather;
3. Is foolproof as to preventing the improper installation thereof upon the filler neck;
4. Provides visual indication when the cap is not properly installed;
5. Is to be as flush as possible with the aircraft surface adjacent thereto when locked in place; and
6. Incorporates means for the positive locking of the cap when in fully installed closed position.

Other objects and advantages of the invention will appear from the following description taken in connection with the drawings forming a part of the specification, and in which:

Fig. 1 is a bottom elevation partly broken away view of the cap and filler neck assembly of Fig. 2;

Fig. 2 is a vertical cross-sectional view of a fuel cap and filler neck assembly embodying the invention taken substantially along lines 2—2 of Fig. 1;

Fig. 3 is an exploded view of the cap and filler neck of Figs. 1 and 2;

Fig. 4 is a view taken substantially along lines 4—4 of Fig. 3;

Fig. 5 is a fragmentary view taken substantially along lines 5—5 of Fig. 3;

Fig. 6 is a view taken substantially along lines 6—6 of Fig. 5;

Fig. 7 is a view taken substanitally along lines 7—7 of Fig. 3;

Fig. 8 is a view taken substantially along lines 8—8 of Fig. 3;

Fig. 9 is a fragmentary view taken substantially along lines 9—9 of Fig. 3;

Fig. 10 is a fragmentary view taken substantially along lines 10—10 of Fig. 3;

Fig. 11 is a fragmentary view taken substantially along lines 11—11 of Fig. 3; and Fig. 12 is a fragmentary view taken substantially along lines 12—12 of Fig. 3.

Similar reference characters indicate corresponding parts throughout the several views of the drawings.

This fuel cap was devised primarily for use on fuel tanks of aircraft vehicles wherein requirement is had for the effective sealing of various aircraft fuels in said tanks under normally high pressure and at even higher momentary pressures. Through the utilization of a plurality of cooperatively connected elements having varied permissible axial and rotative movement relative to one another in the make up of the cap and with the application of the cap to an appropriately designed filler neck the objectives of the invention of this cap are achieved. In the course of the application of the cap to its associated filler neck the cap is first inserted in coupling cooperation with the filler neck through the successive axial and rotative movement thereof to the filler neck, next a further rotation of some of the connected elements of the cap effects a pressure seal of the cap in the filler neck, and last a successive axial and rotative movement of one element of the cap relative to the filler neck and the other elements of the cap locks the cap in position flush with the adjacent surface of the aircraft.

Referring to the drawings for more specific details of the invention 10 represents generally a closure adapted to close filler opening 12 of a filler neck 14, said filler neck forming a part of a fuel container, not shown, to which it is adapted to be attached.

The closure 10 includes basically three operatively interengaged flanged sleeve members 16, 18 and 20 respectively of varying configuration and purpose, and a member 22 operatively engageable with members 16 and 20.

The filler neck 14 includes a flanged sleeve member 24 adapted to be fixedly secured in a container, an annular sealing member 26, supported on an annular shoulder 28 of sleeve member 24, and a flanged sleeve member 30 fixedly secured in the sleeve member 24 with a flange 32 thereof clamping an annular portion 34 of the sealing member 26 upon the shoulder of the sleeve member 24. The interior of the body portion of the sleeve member 24 is of stepped configuration and provides with the sleeve member 30 a substantially straight annular wall with the inner wall 36 of the sleeve member 24 coinciding with the inner wall 38 of sleeve member 30.

An annular portion 40 of the sealing member 26 provides a resilient sealing lip, the purpose of which will hereinafter appear.

Sleeve member 16 includes an axial body portion 42, a substantially right angle flange 44 extending radially inward of the axial portion 42 and a short upturned axial portion 46 integral with the flange 44 at its inner periphery and extending axially in the same direction as the axial portion 42. A pair of diametrically opposite tabs 48 extending radially toward one another are formed on the inner periphery of sleeve member 16 as an extension of flange 44, the purpose of which will hereinafter appear.

A plurality of like configuration equi-circumferentially spaced slots 50 are provided in the axial portion 42 of sleeve member 16, including an axially extended portion 52 in open relation at one end extremity 54 of the sleeve 16 axially opposite flange 44 end thereof and a right angle portion 56 disposed axially inwardly of the end extremity 54 of the sleeve. One side wall 58 of portion 56 of the slot is curved, the purpose of which will hereinafter appear.

In addition to the slots 50 the axial portion 42 of sleeve 16 has a plurality of equi-circumferentially spaced projections 60 on its external periphery, the end surfaces 62 of which are angularly disposed a slight amount to a plane arranged perpendicular to the axis of the closure, the purpose of which will hereinafter appear.

The junction of axial portion 42 and flange 44 on the external periphery of the sleeve 16 provides a combination radial and angular surface 64, the purpose of which will hereinafter appear.

Sleeve member 18 is telescopically received within sleeve member 16 with the external periphery in substantially bearing engagement with the internal periphery of sleeve member 16 and it has an annular outward radially extended flange 66 at one end extremity thereof to which is secured a cover plate or disk 68 for the closure with an annular surface 70 on one axial face thereof being adapted to have sealing relation with the sealing lip on sealing member 26.

A plurality of equi-circumferentially spaced fingers 72, on the opposite end extremity of sleeve member 18 from flange 66, extend radially inward, the purpose of which will hereinafter appear.

A plurality of equi-circumferentially spaced fingers 74 extending radially outward from the body of sleeve member 18 intermediate the end extremities thereof are equal in number and spacing to the slots 50 on sleeve member 16 and each have like configuration to the curved portion 58 of slots 50 and are adapted to be received therein. The end extremity of each finger 74 is notched 76, the purpose of which will hereinafter appear.

Sleeve member 20 is telescopically received in substantially peripheral surface bearing relation in sleeve member 18 and includes in addition to main body portion 78 thereof, an inturned axial flange portion 80 extending concentrically within the body portion and presenting on the end axial extremity thereof a plurality of equi-circumferentially spaced cam surfaces 82, the purpose of which will hereinafter appear.

A plurality of equi-circumferentially spaced slots 84, are provided in the body portion 78 of the sleeve member 20, equal in number to the fingers 72 on the sleeve member 18 and in which the fingers are received. The slots 84 include right angular arranged portions 86 and 88, with portions 86 extending axially of the length of the sleeve whereby the sleeve 18 is permitted to move axially relative to sleeve 20 by way of fingers 72 being received in portions 86 of slots 84 and rotatively relative to sleeve 20 by way of fingers being received in portions 88 of slots 84.

Member 22 includes, a disk or end plate 90, a cup-shaped member 92 secured centrally thereof to the disk 90 by a rivet 94, and a ring member 96 secured by rivets 100 to a radially outwardly extended annular flange 98 provided at the end extremity of member 90 opposite from its securement to disk 88. Ring member 96 has a plurality of outward radially extended fingers 102, equal in number to the cam surfaces 82 of sleeve member 20 with the free end portions of each of said fingers bearing against its respective cam surface 82, the purpose of which will hereinafter appear. Each of the fingers is curved on one face thereof complementary to a curved portion 104 of cam surface 82 in which it is adapted to be received. Member 22 is normally axially biased from member 16 by a coil spring 105.

A plurality of substantially axial slots 106 equal in number to the fingers 48 of sleeve member 16 are provided in the main body portion of cup member 92 whereby as the external periphery of cup member 92 is telescopically received in the axial portion 46 of sleeve member 16, the fingers 48 of sleeve member 16 are received in slots 106.

The disk 90 is arranged in opposed axial relation of flange 44 on sleeve member 16 and provides a combined radial and angular annular surface 108 near its external periphery so as to provide in conjunction with surface 64 of sleeve member 16 a substantially V-shaped annular groove in which is supported an O-ring sealing member 110, said member 110 having a normal diameter of smaller size than the external diameter of walls 36 and 38.

Sleeve member 30 which is fixedly secured in filler neck member 24 is provided in its main body portion with two sets of equi-circumferentially spaced slots 112 and 114 respectively, slots 112 being equal in number and having like circumferential spacing to projections 60 of sleeve member 16 for reception therein of said projections. Slots 114 are equal in number and have like circumferential spacing to the fingers 74 of sleeve member 18 for the reception therein of said fingers, wherein said fingers project through slots 50 in member 16 into the slots 114. Whereas slots 114 include an axial portion 116 and a right angular portion 118, slots 112 include an axial portion 120 and a portion 122 at an angle to portion 120 of slightly less than 90° so as to be complementary to the side surfaces 62 of projections 60. The entrance to portion 116 of slot 114 adjacent flange 32 is shaped complementary to the ends of fingers 74, the purpose of which will hereinafter appear.

The portions 116 and 120 of the respective slots 114 and 112 have their entrance at one axial extremity of member 30, in which they are located, adjacent flange 32 thereof.

A coil spring 124 of slightly less diameter than the internal diameter of cup-shaped member 92 has a portion of its axial length received therein with one extremity bearing against the internal bottom wall thereof and with its other end received in a shallow cup member 126. The cup member 126 is in turn nestled in a cup member 128 fixedly secured to the cover member 68 whereby the cover member 68 is permitted to be rotated relative to cup member 126 to thus avoid impressing a torsional load on spring 124.

A swivel 130 is pivotally attached to the rivet 94 for the attachment thereto of one end of a chain 132, the other end of which is adapted to be attached to an anchor 134 therefor fixedly secured to the sleeve 24 of the filler neck 14.

In applying the closure 10 to filler neck 14, the closure is in the condition wherein fingers 72 of sleeve member 18 are positioned in portion 86 of slot 84 of sleeve member 20, and fingers 102 of ring member 96 are positioned on the low end of the ramp of cam surface 82. With the fingers 72 in portion 86 of slot 84 the spring 124 biases the sleeve members 18 and 20 apart and with the fingers 102 on the low end of the cam ramp, the sealing member 110 is at rest between the opposed angular surfaces of flange 44 of member 16 and disk 90 of member 22.

Upon the initial insertion of the closure 10 into the opening 12 of the filler neck 14, with the sealing member 110 at rest, the closure passes into said opening without interference of the sealing member with either wall 36 of sleeve member 24 or wall 38 of sleeve member 30. In initially inserting the closure in the opening of the filler neck, projections 60 on the sleeve member 16 are positioned to register with slots 112 in sleeve member 30 whereupon the sleeve member 16 is moved first axially and then clockwise relatively to the sleeve member 30 wherein projections 60 move first in portions 120 and then portions 122 of slots 112 with the side surfaces 62 of each projection bearing against the angularly disposed walls bordering portion 122 of slot 112. It is to be noted that the projections 60 because of their end shape relative to the entrance to slots 112 and 114 cannot be made to enter slots 114 and as such provide a foolproof arrangement so as to prevent improper installation of the cap.

With sleeve member 16 locked with sleeve member 30, the cover member 68 and sleeve member 18 are next rotated clockwise relative to sleeve members 16 and 30 whereupon with fingers 72 in portion 86 of slots 84 a clockwise rotation of sleeve member 20 is also effected with the result that cam surfaces 82 bear against the fingers 102 of ring member 96. Simultaneously with the sleeve member 20 being rotated, the member 22 is restrained from rotation by way of tabs 48 being received in slots 106 of cup member 92 whereby as the cam surfaces 82 on member 20 are rotated bearing axially against fingers 102 they serve to move member 22 axially in a direction toward cover 68. As a result of the relative rotation occurring between sleeve member 20 and member 22 the fingers 102 move relative to the cam surfaces from one end of the cam surface to the other end whereupon the fingers become resiliently locked with sleeve member 20 by way of their nesting in portions 104 of the cam surfaces.

The cam surfaces 82 through their engagement with fingers 102 move the fingers 102, ring member 96, cup member 92 and disk 90 axially as a unit, the amount of which is determined by the rise of the ramps of cam surfaces 82. This movement of disk 90 serves to impose a combined axial radial load upon sealing member 110 as a result of its being squeezed between the opposed angular annular surfaces 64 and 108 respectively of sleeve member 16 and disk 90. As such the sealing member 110 is moved radially uniformly into sealing engagement with wall 36 of sleeve member 24 of filler neck 14 so as to effectively seal the filler neck opening and prevent fluid leakage past the closure.

With the closure actuated to fluid sealing position the sleeve member 18 and cover 68 are moved axially against the resistance of spring 124 through the reception of fingers 74 in portions 52 and 116 of slots 50 and 114 respectively of sleeves 16 and 30 and thence rotatively in portions 56 and 118 of the respective slots 50 and 114 whereupon the curved portions of fingers 74 mate with the curved wall portions 58 bordering slot portions 56 for the resilient locking thereof of the sleeve members 16, 18 and 20 together. Simultaneously with this movement of the sleeve member 18 fingers 72 move freely in slots 84 both axially and rotatively so as not to interfere with the actuation of the closure to its closed and locked position of Figs. 1 and 3.

With the cover 68 in the position of Figs. 1 and 3 the annular under surface thereof near its outer periphery seals against annular lip 40 of sealing member 26 to inhibit the passage of foreign matter therepast.

For the removal of the closure from the filler neck a complete reversal of operational steps to its application is required wherein it is necessary initially to apply a slight axial load upon the cover 68 effective to overcome the resistance of spring 124 tending to hold the sleeve member 18 by way of fingers 74 in resiliently locked relation to the sleeve member 16 and rotate the sleeve member 18 counter-clockwise. As such the fingers 74 move rotatively in the corresponding portions 56 and 118 of the respective slots 50 and 114 and upon reaching the position of the portions 52 and 116 of the respective slots 50 and 114 with the load released from the cover 68, the cover 68 and sleeve member 18 affixed thereto pop out. A subsequent counter-clockwise rotation of the cover 68, sleeve member 18 and sleeve member 20 moved by the engagement of fingers 72 with sleeve member 20 provides for release of the sealing member 110 from engagement with the wall 36 of filler neck sleeve member 24. A final counter-clockwise rotation of the cover 68 and sleeve member 118 affixed thereto results in the movement of the projections 60 from portions 122 of slot 112 to portions 120 thereof for the further simple axial extraction of the closure from the filler neck 14.

While this invention has been described in connection with certain specific embodiments, the principle involved is susceptible of numerous other applications that will readily occur to persons skilled in the art. The invention, therefore, is limited only as indicated by the scope of the appended claims.

What we claim is:

1. A closure for fluid containers comprising a circular plate member, a cylindrical member coupled to and coaxial with the plate member for solely axial movement relative thereto, a first sleeve member, telescoped within the cylindrical member, engageable and coaxial with the cylindrical member and rotatable relative to the plate and cylindrical members, a second sleeve member, telescoped between the first sleeve member and the cylindrical member, coupled to the first sleeve member axially moveable relative thereto and rotatably moveable therewith, an annular sealing element engageably disposed between the plate and cylindrical members adjacent the external periphery thereof, said second sleeve member having a plurality of circumferentially spaced projections on its external periphery, said cylindrical member having a plurality of circumferentially spaced projections on its external periphery adapted to be received in the slots of the filler neck of the container to which the closure is adapted to be applied and said cylindrical member having a plurality of circumferentially spaced slots therein adapted to receive the spaced projections of the second sleeve member therein, and cam means provided between the first sleeve member and cylindrical member with which it is engageable providing for relative axial movement between the plate and cylindrical members.

2. A closure according to claim 1 wherein coupling arrangement between the plate and cylindrical members is in the form of axial splines.

3. A closure according to claim 1 wherein the first sleeve member has a plurality of circumferentially spaced slots therein and the second sleeve member has a plurality of circumferentially spaced projections on its internal periphery equal in number to the slots in the first sleeve member for receipt therein.

4. A closure for fluid containers comprising a circular plate member, a cylindrical member coupled to and coaxial with the plate member for solely axial movement relative thereto, a first sleeve member, telescoped within the cylindrical member, engageable and coaxial with the cylindrical member and rotatable relative to the plate and cylindrical members, a second sleeve member, telescoped between the first sleeve member and the cylindrical member, coupled to the first sleeve member axially moveable relative thereto and rotatably moveable therewith, an annular sealing element engageably disposed between the plate and cylindrical members adjacent the external periphery thereof, said second sleeve member having a plurality of circumferentially spaced projections on its external periphery, said cylindrical member having a plurality of circumferentially spaced projections on its external periphery adapted to be received in the slots of the filler neck of the container to which the closure is adapted to be applied and said cylindrical member having a plurality of circumferentially spaced slots therein adapted to receive the spaced projections of the second sleeve member therein, and cam means provided between the first sleeve member and cylindrical member with which it is engageable providing for relative axial movement between the plate and cylindrical members, said cylindrical member including a sleeve and a radial flange integrally formed to provide an angular annular surface at the junction therebetween, said plate member including an angular annular surface near its outer periphery disposed axially opposite the angular surface of the cylindrical member and said annular sealing element being engageably disposed between the angular surfaces of the plate and cylindrical members.

5. A closure according to claim 4 wherein the sleeve of the first sleeve member has an inward axially turned flange on one end thereof, and the extremity of the flange has a cam means thereon and wherein the plate member includes an element fixedly secured thereto having radially extended finger means therein engaging the cam means on the first sleeve member.

6. A closure according to claim 4 wherein spring means are provided disposed between the plate and second sleeve members, mounted for stationary movement with the plate member and biasing relative rotation to the sleeve member.

7. A closure in combination with a filler neck for a fluid container according to claim 4 wherein the filler neck has a plurality of like circumferentially spaced combination axial and right angular portioned slots adapted to receive the projections on the sleeve of the cylindrical member therein.

8. A closure according to claim 7 wherein the filler neck has another plurality of like circumferentially spaced combination axial and right angular portioned slots adapted to receive the projections on the sleeve of the second sleeve member therein.

9. A closure for fluid containers comprising a cylindrical member including a sleeve portion and an integral disk portion at one axial extremity thereof having an annular surface near its outer periphery at the junction of the portions disposed substantially angularly in radial cross-section to the axis of said cylindrical member, a disk-like member including a centrally disposed cup-like member, coaxial with the cylindrical member mounted for solely axial movement relative to the cylindrical member having near its outer periphery an annular surface disposed substantially angularly in radial cross-section to the axis of said disk-like member of substantially equal size and shape to the annular surface on said cylindrical member, arranged in axial spaced opposed relation to the annular surface on said cylindrical member so as to provide therewith a substantially wedge-shaped channel, an annular resilient sealing element seated in the channel engageable with the annular surfaces of the cylindrical and disk-like members, and means including a circular track cam disposed radially inwardly of the sleeve portion of the cylindrical member and having a portion axially disposed between a portion of the cup-like member and the disk portion of the cylindrical member, said cam track being engageable with a portion of the cup-like member and relatively rotatable to the cylindrical and cup-like members for effecting axial movement between said cylindrical and disk-like members.

10. A closure according to claim 9 wherein the normal external at rest diameter of the sealing element is substantially equal to or less than the external diameters of the cylindrical and disk-like members.

11. A closure according to claim 9 wherein the cylindrical and disk-like members have axial splined relation with one another.

12. A closure according to claim 9 wherein said cylindrical member has means on the external surface of its sleeve portion adapted to have bayonet-locking engagement with a filler neck of the fluid container to which it is adapted to be applied.

13. A closure according to claim 9 wherein the cam means includes a part in axial abutting relation to said cylindrical member and another part in axial abutting and rotative engagement with the disk-like member.

14. A closure according to claim 9 wherein the fluid container to which the closure is adapted to be applied includes a filler neck having a diameter greater than the normal external at rest diameter of the sealing element and wherein upon relative axial movement of said cylindrical and disk-like members toward one another said sealing element is expanded radially into annular sealing engagement with the internal diametral wall of the filler neck.

15. A closure according to claim 14 wherein the filler neck has a plurality of substantially identical slots therein and said cylindrical member has means therein engageable in the slots of the filler neck for securing the closure to the filler neck.

16. A closure for fluid containers in combination with a cylindrical filler neck for a fluid container in which the closure is to be secured in sealing relation, said filler neck including an inner sleeve having bayonet slots therein, said closure comprising first sleeve means including projecting portions axially and rotatively engageably movable relative to some of the slots in the filler neck for initially securing the closure to the filler neck, an annular sealing element engageable by an annular portion of the first means, second sleeve means axially engageable with a part of the first sleeve means providing for the radial outward movement of the sealing element into annular engagement with the filler neck, and third sleeve means including projecting portions axially and rotatively engageably movable relative to other slots in the filler neck for further securing the closure relative to the filler neck.

17. A closure for fluid containers in combination with a cylindrical filler neck for a fluid container in which the closure is to be secured in sealing relation, said filler neck including an inner sleeve having bayonet slots therein, said closure comprising first cylindrical means including portions engageable with slots in the filler neck and movable axially and rotatively thereto for initially securing the closure to the filler neck, an annular sealing element supported by the first cylindrical means, second cylindrical means axially engageable with the first cylindrical means and movable rotatively thereto for moving the annular sealing element into annular sealing engagement with the filler neck, and third cylindrical means including portions engageable with other slots in the filler neck and movable axially and rotatively thereto for further securing the closure relative to the filler neck.

18. A closure for fluid containers in combination with a cylindrical filler neck for a fluid container in which the closure is adapted to be secured, said filler neck having bayonet slots in its inner surface, said closure comprising first cylindrical means including outward radially projecting elements lockingly engageable with some of the filler neck slots for initially securing the closure to the filler neck, relatively axially and rotatively moveable to the filler neck, an annular sealing element annularly engageable with the first cylindrical means, second cylindrical means axially engageable with and rotatable to the first cylindrical means subsequent to the initial securement of the closure to the filler neck effective to provide radial outward movement of the sealing element into engagement with the filler neck, and third cylindrical means including outward radially projecting elements lockingly engageable with the other slots in the filler neck further rotatable and axially movable relative to the first cylindrical means and filler neck for further securing the closure relative to the filler neck.

19. A closure in combination with a filler neck according to claim 18 wherein spring means normally bias the first and third means apart and wherein said means when biased apart are coupled together providing for the rotation thereof together.

20. A closure in combination with a filler neck according to claim 18 wherein the first means includes elements solely relatively axially movable to one another with the sealing element supported therebetween.

References Cited in the file of this patent

UNITED STATES PATENTS

| 596,612 | North | Jan. 4, 1898 |
| 996,461 | Costa | June 27, 1911 |
| 1,059,053 | Lennon | Apr. 15, 1913 |
| 1,377,840 | Latham | May 10, 1921 |
| 1,736,350 | Larsen | Nov. 19, 1929 |
| 2,064,569 | Santucci | Dec. 15, 1936 |
| 2,164,450 | Eshbaugh et al. | July 4, 1939 |
| 2,335,309 | Pfleumer | Nov. 30, 1943 |
| 2,335,906 | Blinn | Dec. 7, 1943 |
| 2,509,770 | Kresta | May 30, 1950 |
| 2,564,232 | Rausenberger | Aug. 14, 1951 |

FOREIGN PATENTS

| 587,287 | Great Britain | Apr. 21, 1947 |